(12) United States Patent
D'Agostini et al.

(10) Patent No.: US 11,598,520 B2
(45) Date of Patent: Mar. 7, 2023

(54) OXY-FUEL BURNER FOR GLASS FOREHEARTHS

(71) Applicant: Air Products and Chemicals, Inc., Allentown, PA (US)

(72) Inventors: Mark Daniel D'Agostini, Allentown, PA (US); Michael J. Gallagher, Coopersburg, PA (US); Ashwin Vinod, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 356 days.

(21) Appl. No.: 16/884,418

(22) Filed: May 27, 2020

(65) Prior Publication Data

US 2021/0372611 A1 Dec. 2, 2021

(51) Int. Cl.
*F23D 14/14* (2006.01)
*F23D 14/64* (2006.01)

(52) U.S. Cl.
CPC ............ *F23D 14/145* (2013.01); *F23D 14/64* (2013.01); *F23D 2900/00003* (2013.01)

(58) Field of Classification Search
CPC ........ F23D 14/145; F23D 14/32; F23D 14/48; F23D 14/70; F23D 14/64; F23D 2900/00003
USPC .......................................................... 431/354
See application file for complete search history.

(56) References Cited

U.S. PATENT DOCUMENTS

| | | | | |
|---|---|---|---|---|
| 3,633,125 | A * | 1/1972 | Whitehouse | H01S 3/036 372/98 |
| 4,165,364 | A * | 8/1979 | Dollinger | C09C 1/50 422/151 |
| 8,881,500 | B2 * | 11/2014 | Gutmark | F23R 3/16 60/39.38 |
| 2011/0061469 | A1 * | 3/2011 | Maahs | G01F 1/3209 702/45 |
| 2014/0338771 | A1 * | 11/2014 | Brown | F15D 1/025 138/40 |

(Continued)

OTHER PUBLICATIONS

W. R. Hawthorne, et al., "Mixing and Combustion in Turbulent Gas Jets", Third Symposium on Combustion, Flame and Explosion Phenomena, pp. 266-288, 1949.

(Continued)

*Primary Examiner* — Avinash A Savani
(74) *Attorney, Agent, or Firm* — Jason M. Ploeger

(57) ABSTRACT

A burner gas supply apparatus for increasing flame turbulence, the apparatus comprising a conduit having a characteristic width, W, defined by an inner surface having a circumferential direction and an axial direction, the axial direction terminating in a nozzle defining a nozzle exit plane and having a characteristic dimension, d, where $d \leq W$; and three bluff bodies each with a characteristic dimension, $D_{bb-i}$, projecting a length, $L_i$ into the conduit from the inner surface, and an axial spacing $X_i$ between adjacent bluff bodies (between the downstream bluff body and the nozzle exit plane in the case of $X_1$) wherein $0.5 \leq L_i/W \leq 1$ and wherein $X_i/D_{bb-i} \leq 30$.

12 Claims, 14 Drawing Sheets

(56) References Cited

U.S. PATENT DOCUMENTS

2016/0107914 A1* 4/2016 Baker .................... F23D 14/22
                                                        431/355

OTHER PUBLICATIONS

H. C. Hottel, et al., "Diffusion in Laminar Jet Flames", Third Symposium on Combustion, Flame and Explosion Phenomena, pp. 254-266, 1949.

* cited by examiner

OXY-FUEL BURNER FOR GLASS FOREHEARTHS

BACKGROUND

Effective design of a combustion burner requires control of flame properties, most notably the flame length. Precise knowledge of flame length is particularly important since many burners are installed in combustion chambers that afford no visual access to verify the flame properties during operation. While experimentation and engineering guidelines are helpful for predicting flame length based on burner and combustion chamber design and operational parameters, it is known that prediction and control of flame length is more reliable for turbulent flames than for laminar flames. While many factors can influence the transition point from a laminar to a turbulent flame, a non-dimensional Reynolds Number, $Re_j$, based on the properties of the flow and geometric properties of the burner's central jet is conventionally employed. This is defined as follows in equation 1:

$$Re_j = \rho V_j D_j / \mu \qquad (1)$$

where $\rho$ is the central jet density at the nozzle exit plane; V is the central jet average nozzle exit velocity, D is the nozzle diameter and $\mu$ is the central jet dynamic viscosity, again determined by conditions at the nozzle exit plane.

As pointed out in a seminal paper by Hawthorne et al ("Mixing and Combustion in Turbulent Gas Jets", *Third Symposium on Combustion, Flame and Explosion Phenomena*, pp. 266-288, 1949), the characteristically different response of flame length to gas flow rate in laminar and turbulent flows is rooted in the inherent difference between molecular and eddy diffusivity. Mixing in a laminar flame is governed by molecular diffusivity, a material property of the gases being mixed, while mixing in turbulent flames is driven by turbulent "eddies." Unlike molecular diffusivity, so-called eddy diffusivity is not a material property, but scales with the product of flame jet velocity and nozzle exit plane diameter. The resultant effect on flame length associated with these disparate modes of mixing is summarized in FIG. 1. That is, the normalized length, L/D (L is flame length and D is nozzle exit plane diameter), of a laminar jet flame increases with nozzle flow rate while that of a turbulent jet flame remains constant.

It is further evident from FIG. 1 that the maximum length of a laminar flame may be substantially longer than that of a fully turbulent flame. So, although a flame may be designed principally for turbulent operation, it is possible that off-design, reduced flow operation could lead to a longer-than-desirable flame that may impinge on combustor end-walls and thereby lead to premature failure of wall insulating and structural materials or heat transfer surfaces.

Finally, in most practical combustion applications the furnace internal environment is generally not quiescent. Long, laminar flames tend to be relatively difficult to control in these situations since much of the fuel stream remains unreacted while its momentum has dissipated. By contrast, the turbulent jet flame mixes rapidly and the stability of the flame jet thereby benefits from increased velocity of the expanding hot gases. Consequently, laminar flames are much more prone to deflection by furnace gas currents and incomplete combustion than turbulent flames, and these deficiencies often lead to performance and operational shortfalls related to reduced and/or mis-directed flame-to-load heat transfer and reduction in process fuel efficiency.

SUMMARY

A burner is described herein comprising at least two bluff bodies in the burner gas supply conduit at different axial positions upstream of the exit plane. The use of multiple bluff bodies facilitates the diffusion of turbulence by initiation of eddies at multiple locations in the flow field, while the longitudinal spacing promotes amplification of turbulent effects emanating from each upstream bluff body via flow field interactions.

Each bluff body may be introduced from a different circumferential position around the inner surface of the gas supply conduit. This orientation generates eddy vorticity having distinct axes (for vorticity is a vector quantity) which subsequently results in more efficient distribution of turbulence throughout the flow field.

Aspect 1: A burner gas supply apparatus for increasing flame turbulence, the apparatus comprising a conduit having a characteristic width, W, defined by an inner surface having a circumferential direction and an axial direction, the axial direction terminating in a nozzle defining a nozzle exit plane having a characteristic dimension, d, where d<=W; and a first bluff body having characteristic dimension, $D_{bb-1}$, projecting a length, $L_1$, into the conduit from the inner surface, wherein $0.5<=L_1/W<=1$, the first bluff body being spaced apart from the nozzle exit plane by an axial distance of $X_1$, wherein $X_1/D_{bb-1}<=30$; and a second bluff body having a characteristic dimension, $D_{bb-2}$, projecting a length, $L_2$, into the conduit from the inner surface, wherein $0.5<=L_2/W<=1$, the second bluff body being further from the nozzle exit plane than the first bluff body and spaced apart from the first bluff body by an axial distance of $X_2$, wherein $X_2/D_{bb-2}<=30$; a third bluff body having a characteristic dimension, $D_{bb-3}$, projecting a length, $L_3$, into the conduit from the inner surface, wherein $0.5<=L_3/W<=1$, the third bluff body being further from the nozzle exit plane than the second bluff body and spaced apart from the second bluff body by an axial distance of $X_3$, wherein $X_3/D_{bb-3}<=30$; wherein the first bluff body and the second bluff body are separated in the circumferential direction by a first spacing angle; and wherein the second bluff body and the third bluff body are separated in the circumferential direction by a second spacing angle.

Aspect 2: A burner gas supply apparatus according to Aspect 1, wherein $0.5*(1+d/W)<=L_1/W<=1$; wherein $0.5*(1+d/W)<=L_2/W<=1$; and wherein $0.5*(1+d/W)<=L_3/W<=1$.

Aspect 3: A burner gas supply apparatus according to Aspect 1 or Aspect 2, wherein $0.8<=L_1/W<=1$; wherein $0.8<=L_2/W<=1$; and wherein $0.8<=L_3/W<=1$.

Aspect 4: A burner gas supply apparatus according to any of Aspects 1 to 3, wherein $0.6<=d/W<=0.7$.

Aspect 5: A burner gas supply apparatus according to any of Aspects 1 to 4, wherein $X_1/D_{bb-1}<=5$; wherein $X_2/D_{bb-2}<=5$; and wherein $X_3/D_{bb-3}<=5$.

Aspect 6: A burner gas supply apparatus according to any of Aspects 1 to 5, wherein the first bluff body and the conduit are sized so that a first bluff body Reynolds number, $Re_{bb-1}=\rho V_{inlet} D_{bb-1}/\mu$, is equal to or greater than 50; and wherein the nozzle characteristic dimension, d, is sized so that a jet Reynolds number, $Re_j=\rho V_j d/\mu$, is equal to or greater than the first bluff body Reynolds number, $Re_{bb-1}$.

Aspect 7: A burner gas supply apparatus according to any of Aspects 1 to 6, wherein the first bluff body has a circular cross-section.

Aspect 8: A burner gas supply apparatus according to any of Aspects 1 to 7, wherein the first spacing angle and the second spacing angle are each greater than 60 degrees and less than 180 degrees.

Aspect 9: A burner gas supply apparatus according to any of Aspects 1 to 8, wherein the first spacing angle and the second spacing angle are each from 110 degrees to 130 degrees.

Aspect 10: A burner gas supply apparatus according to any of Aspects 1 to 9, wherein the first spacing angle and the second spacing angle are each from 80 degrees to 100 degrees.

Aspect 11: A burner gas supply apparatus according to any of Aspects 1 to 10, further comprising a fourth bluff body having a characteristic dimension, $D_{bb-4}$, projecting a length, $L_4$, into the conduit from the inner surface, wherein $0.5<=L_4/W<=1$, the fourth bluff body being further from the nozzle exit plane than the third bluff body and spaced apart from the third bluff body by an axial distance of $X_4$, wherein $X_4/D_{bb-4}<=30$; wherein the third bluff body and the fourth bluff body are separated in the circumferential direction by a third spacing angle.

Aspect 12: A burner gas supply apparatus according to Aspect 11, wherein the third spacing angle is from 80 degrees to 100 degrees.

Aspect 13: A burner comprising a burner gas supply apparatus as in any of Aspects 1 to 12; and a reactant conduit surrounding the burner gas supply apparatus; wherein the burner gas supply apparatus is configured and arranged to supply one of a fuel and an oxidant; and wherein the reactant conduit is configured and arranged to supply the other of a fuel and an oxidant.

BRIEF DESCRIPTION OF THE DRAWINGS

The present invention will hereinafter be described in conjunction with the appended figures wherein like numerals denote like elements:

FIG. 2A shows of bending of laminar oxy-fuel flames due to furnace gas cross-flow on outboard end just upstream of forehearth exhaust port, wherein G shows the direction of furnace gas flow; FIG. 2B shows opposite wall laminar flame impingement in upstream end of forehearth.

FIG. 8A is a cross-sectional side view; FIG. 8B is an end view.

FIG. 9A is an end view; FIG. 9B is a cross-sectional side view.

FIGS. 10A, 10B, and 100 are cross-sectional side schematic views of three burner gas supply conduits: FIG. 10A shows a baseline burner gas supply conduit with no features specifically intended to increase turbulence; FIG. 10B shows a burner gas supply conduit having a cavity-actuated nozzle.

DETAILED DESCRIPTION

Figure 2A:
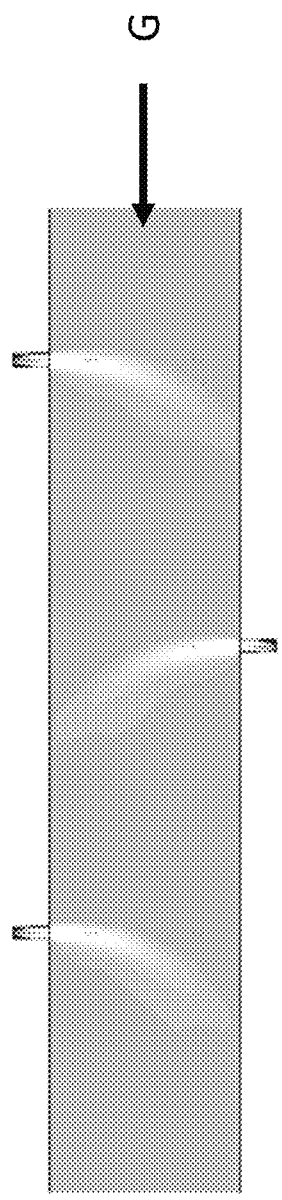
FIGS. 2A and 2B are shaded images showing computational fluid dynamics models of laminar flame behavior in an oxy-fuel forehearth wherein lighter colors indicate higher temperatures.
Figure 2B:
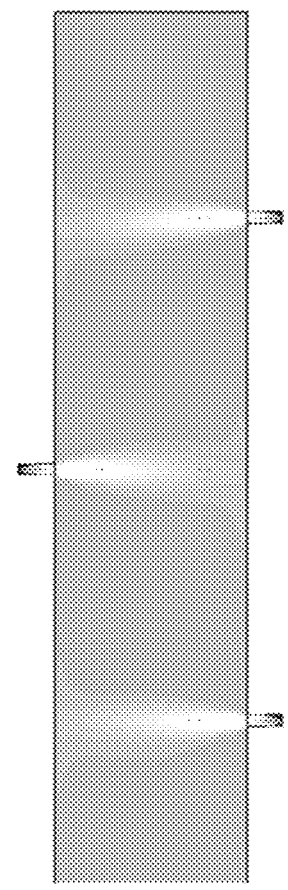

Forehearths are employed in many glass manufacturing facilities to provide slow but controlled cooling of the molten glass prior to forming in the cold end. Precise control of cooling rates, which occurs due to a balance between heat loss through the forehearth walls and heat input via burners, is critical to preventing formation of glass defects. Since a single forehearth may employ several hundred burners firing across narrow channels (typically 2-3 ft wide), post-installation inspection of burner flames is not practical. Moreover, oxy-fuel burner firing rates are relatively low and flame jet Reynolds numbers are often in a range where low momentum laminar flames prevail. Further, the influence of flame disturbance due to cross-flow of combustion gases within the forehearth channel can be significant. The deleterious effect of a multitude of laminar flames in such an environment is illustrated in FIGS. 2A and 2B, which summarizes CFD modeling results of oxy-fuel burners in a forehearth. As shown in FIG. 2A, the flames bend the most in the region most affected by furnace gas currents G while, as shown in FIG. 2B, the flames impinge on the opposite wall in the more quiescent region of combustion space.

Due to the very low firing rate requirement in a forehearth, oxy-fuel burners in a forehearth frequently produce jet-like flames that are laminar or transitional (in the process of changing from laminar to turbulent). An undesirable aspect of laminar and transitional flames is that their flame length and stability changes very significantly with increasing or decreasing firing rate. This is prone to cause problems in forehearth operation that may go undetected as it is very difficult to observe flames from outside the forehearth.

Therefore, as described herein, burner features have been identified to generate transition to a turbulent flame at lower Reynolds numbers than would naturally occur in a typical burner, while also avoid any unnecessary increase in pressure drop. This design results in the ability to operate oxy-fuel burners in a forehearth with a turbulent flame that provides better control and reliability.

Further, the rapid mixing associated with the fully turbulent regime significantly reduces soot formation and flame temperature stratification, which assists in precise temperature control within the forehearth. Other features may include variability in the central nozzle axial position within the forehearth burner block and the ability for on-the-fly removal and replacement of the entire central nozzle assembly.

In the embodiments described herein, the central nozzle flows a fuel gas and is surrounded by an annular oxidant flow that typically comprises oxygen-enriched air or oxygen. Flowing fuel gas through the central nozzle typically reduces the amount of unburned fuel. However, the same enhanced mixing benefits can be achieved in a burner wherein the central nozzle flows oxidant and is surrounded by an annular fuel gas flow.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

Figure 3:
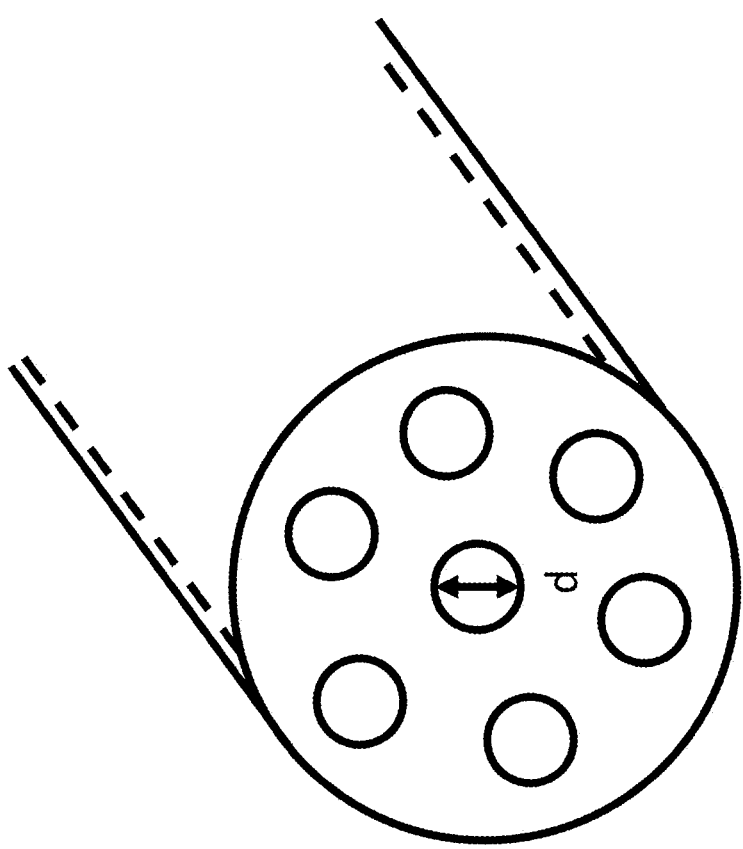
FIG. 3 is a perspective end view schematic of an exemplary burner tip with multiple small nozzles of diameter d to create high velocity jets and increased surface area to enhance turbulent interaction with other gases in the furnace or exiting the burner.
Figure 4:
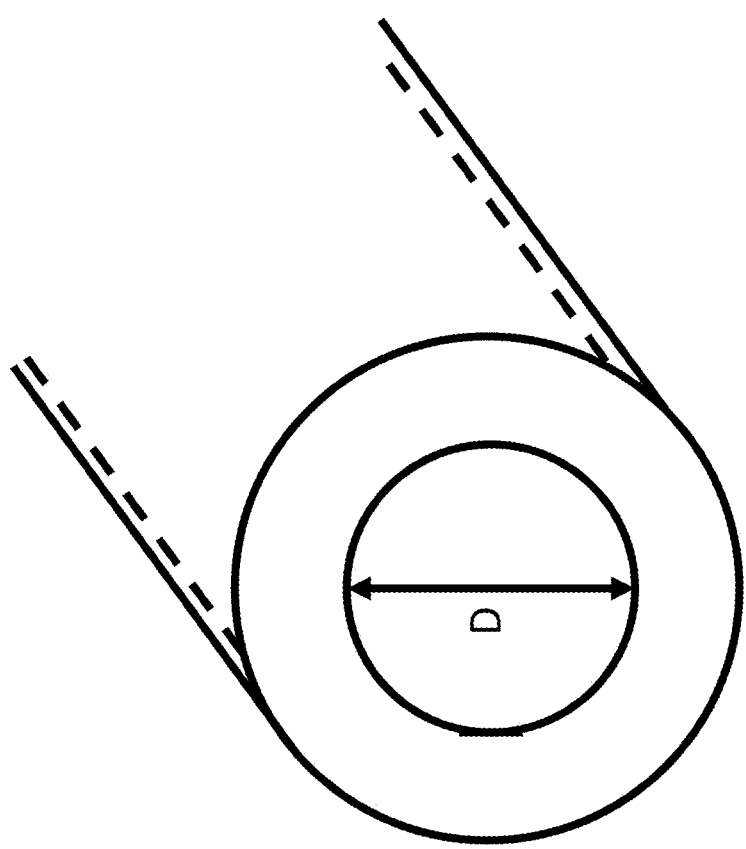
FIG. 4 is a perspective end view schematic of a burner tip having a single nozzle of diameter D to yield the same overall cross-sectional area as the multiple nozzles in FIG. 3 but with a single, undisturbed jet.

Various turbulence generators are used in combustion and related arts. Oftentimes these devices enhance mixing via the creation of an array of high velocity jets via N small nozzles in a burner tip as depicted in FIG. 3 (noting that the number of nozzles is exemplary only, and that the same concept applies for any number of nozzles in the burner tip). The resultant dissipation of pressure energy across such a device is significantly higher than that of a single jet of diameter, D, as in FIG. 4, where $D^2 > Nd^2$. For example, assume a gas having a mass flow rate, M, absolute viscosity, $\mu$, and density, $\rho$, flows through a nozzle having a single outlet with diameter, D, and expands into a chamber having much larger cross-sectional dimensions. The loss of total pressure, $\Delta P_{T,baseline}$, due to dissipation of kinetic energy at the nozzle exit is proportional to $\frac{1}{2}\rho V^2$, where V is the average nozzle velocity, while the jet Reynolds number, $Re_{j,baseline}$ equals $\rho V D/\mu$. Assume the nozzle is instead configured with N holes of diameter, d, such that the composite cross-sectional area of the nozzle exit is reduced from A, where A is equal to $\pi D^2/4$, to $A_d$, where $A_d$ is equal to $\pi N d^2/4$, and $A_d < A$. It can be shown as a first approximation that the changes in total pressure loss and jet Reynolds number relative to the baseline case of a single nozzle having diameter, D, are related to the reduction in nozzle area by equations 2 and 3:

$$\Delta P_{T,actual}/\Delta P_{T,baseline} = (A/A_d)^2 \qquad (2)$$

$$Re_{j,actual}/Re_{j,baseline} = (A/A_d)^{0.5} \qquad (3)$$

Figure 5:
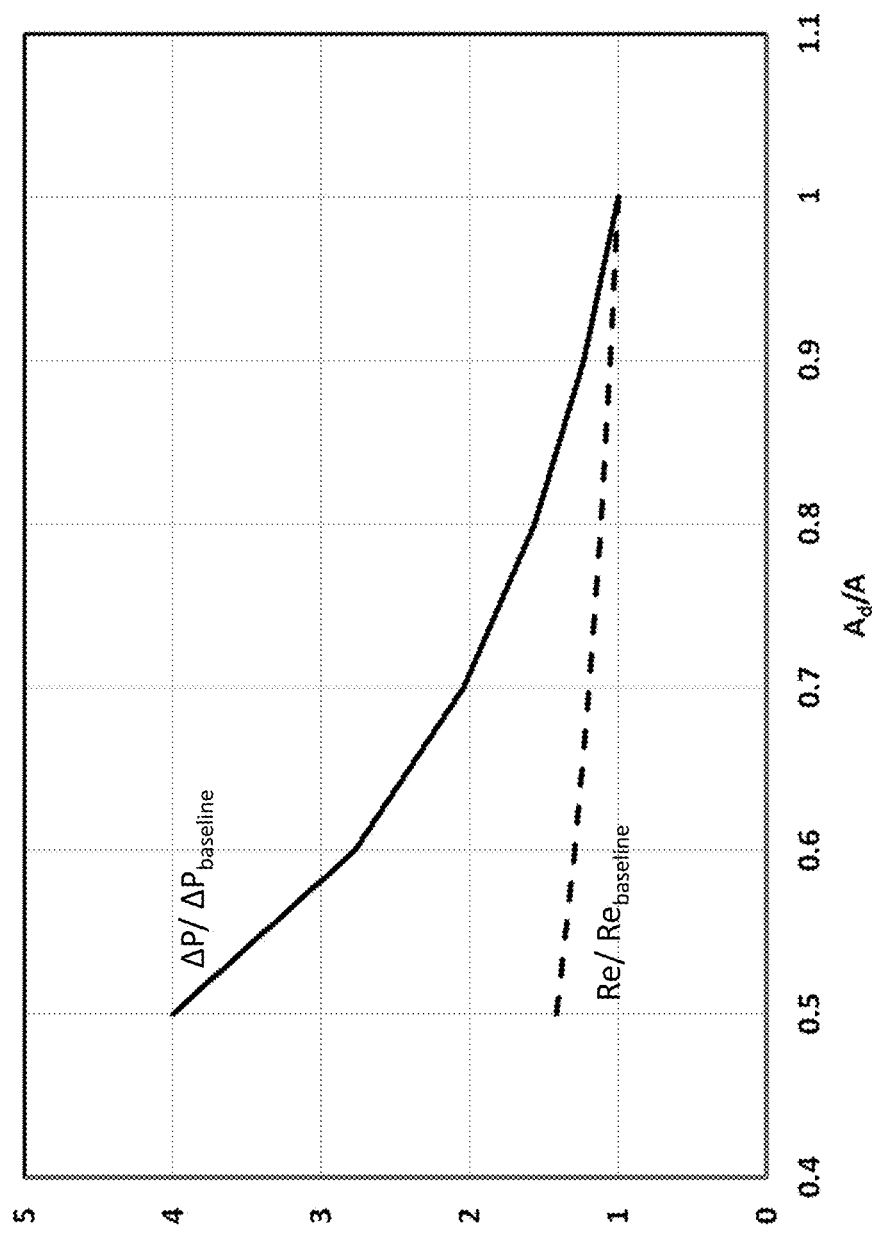
FIG. 5 is a plot of Reynolds number and pressure drop as a function of the hole diameter in a multi-nozzle burner tip as in FIG. 3.
Figure 6:
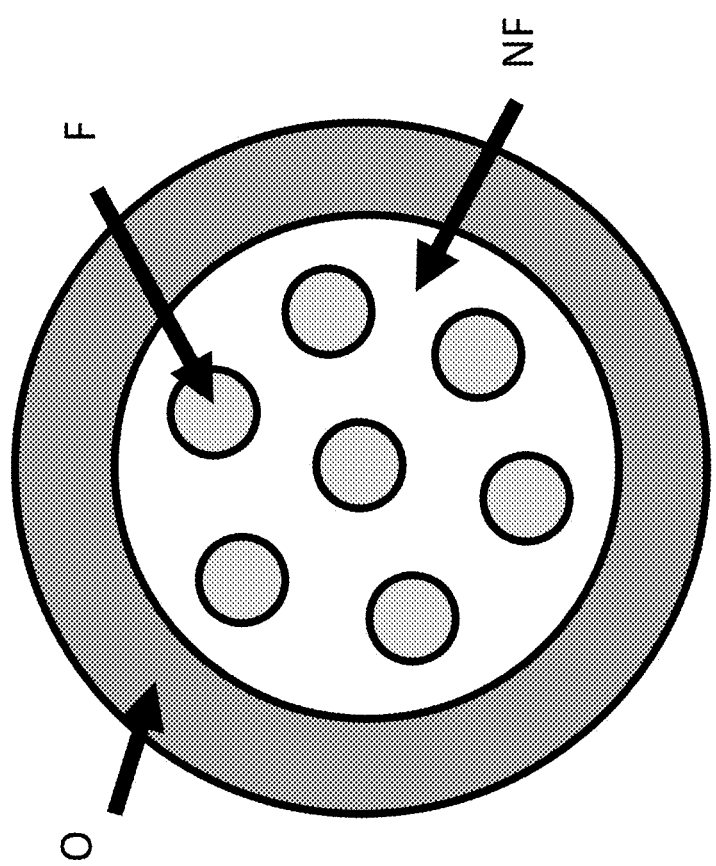
FIG. 6 is an end view schematic showing the application of a multi-nozzle burner tip as in FIG. 3 for oxy-fuel combustion, wherein fuel F is flowed through the multi-nozzle burner tip surrounded by an annulus of oxygen flow O, and oxy-fuel combustion occurs between jets of fuel leading to high temperatures on the surface of the nozzle face NF.

These relationships are plotted in FIG. 5 as a function of $A_d/A$. FIG. 5 illustrates that the undesirable increase in pressure loss with reduction in nozzle flow area greatly outpaces the desirable increase in Reynolds number. Moreover, if multiple small holes are employed, local combustion would occur at the nozzle surfaces separating the various holes, as illustrated in FIG. 6. Because turbulence drives rapid combustion, with oxy-fuel flame temperatures in excess of 5000° F., local combustion would damage the burner and decrease burner lifetime. It is for these reasons that the present burner is not configured as shown in FIGS. 5 and 6.

Figure 7:
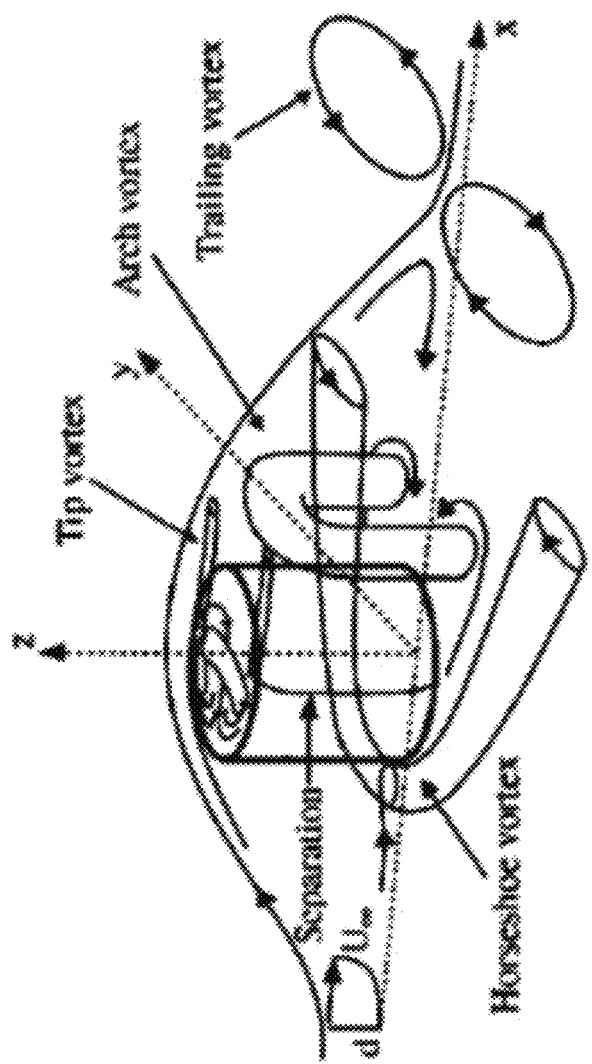
FIG. 7 is a perspective schematic showing the qualitative flow structures that form due to flow past a truncated circular cylinder.

To be of practical industrial value, a forehearth oxy-fuel burner should be capable of generating a turbulent flame at low Reynolds number while minimizing the loss of total pressure. The inventors have determined that an effective device for enabling this low Reynolds number laminar to turbulent flame transition is a truncated bluff body within the flow conduit of the center jet upstream of a nozzle exit plane. As used herein, the term "truncated" means that one end of the bluff body emanates from a flow boundary while the other end is terminated within the flow field. The term "upstream" means a location that is further from the nozzle exit plane, as opposed to a "downstream" location closer to the nozzle exit plane. FIG. 7 illustrates a truncated circular cylinder in a flow field and the numerous forms of vorticity produced therefrom. These vertical structures may be formed at low Reynolds number which allows the strategic arrangement of multiple bluff bodies to produce a transition from laminar to turbulent flow at the nozzle outlet that occurs at low Reynolds number with a low pressure loss.

In an alternative embodiment, the bluff bodies may be non-truncated, i.e. attached at both ends to the inner surface of the nozzle. Note, by comparison, that a non-truncated bluff body possesses the horseshoe vortices at each end of the cylinder, but does not possess either the tip or trailing vortex. Moreover, the arch vortex is replaced by dual vortex tubes whose axes are aligned with that of the cylinder axis. While the flow structures of the non-truncated cylinder do not possess the same degree of three-dimensionality as the truncated cylinder, the inventors have found that the non-truncated cylinder can still be used advantageously in a burner for the application described herein.

Figure 8B:
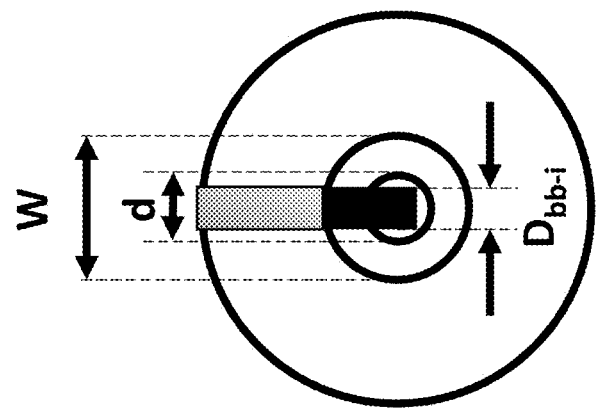
FIGS. 8A and 8B are schematics showing an embodiment of a burner gas supply conduit with two bluff bodies projecting from the inner wall into the flow path of the gas upstream of the exit plane (on the left side of FIG. 8A)
Figure 8A:
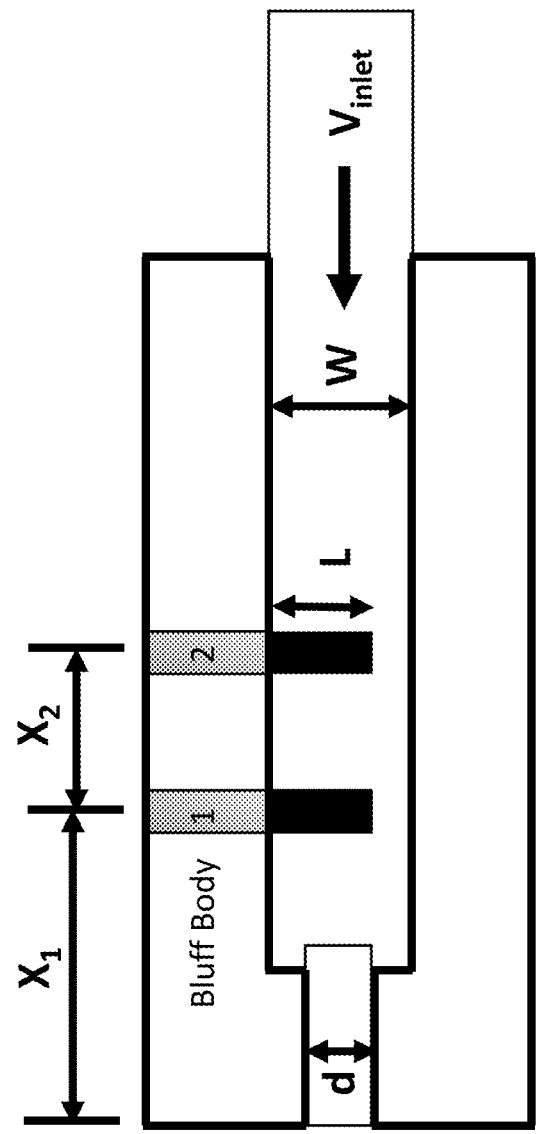

An embodiment of an oxy-fuel burner described herein is based on a strategic arrangement of multiple bluff bodies to amplify the effects of the vorticity formed at each bluff body and, in so doing, catalyzes the low-Reynolds Number laminar-to-turbulent transition of the burner flame. Accordingly, the present burner comprises at least two bluff bodies in the central conduit at different axial positions upstream of the exit plane as illustrated in FIG. 8A. The use of multiple bluff bodies facilitates the diffusion of turbulence by initiating eddies at multiple locations in the flow field, while the longitudinal spacing promotes amplification of turbulent effects emanating from each upstream bluff body via flow field interactions.

Figure 9B:
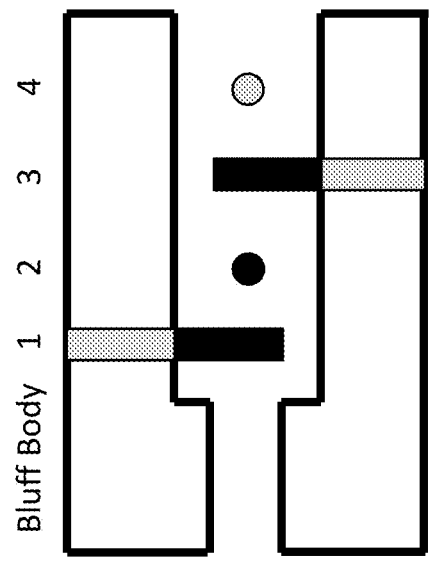
FIGS. 9A and 9B are schematics showing an embodiment of a burner gas supply conduit with four bluff bodies projecting from the inner wall into the flow path of the gas in which each adjacent bluff body is rotated 90° along the circumference.

There are five important features of the inventive burner that can be used separately, and preferably in combination with one another:

First, the Reynolds number of the gas flow past each bluff body should be greater than the minimum Reynolds number for formation of a Karman vortex street in its wake, as this produces a flow unsteadiness from which turbulence develops. For the burner described herein, a minimum bluff body Reynolds number ($Re_{bb-1}$) of 50 was used. For $Re_{bb-1}$ and $D_{bb-i}$, i refers to the numerical index for each bluff body as can be seen in FIGS. 8A and 9B. The bluff body Reynolds number is calculated according to equation 4:

$$Re_{bb-i} = \rho V_{inlet} D_{bb-i}/\mu \qquad (4)$$

where the velocity, $V_{inlet}$, and length scale, $D_{bb-i}$, pertain to the average free-stream gas velocity approaching the bluff body and dimension of the i-th bluff body in a plane that is perpendicular to the principal direction of flow. In the case of a non-circular bluff body, the length scale, $D_{bb-i}$, represents the breadth of the i-th bluff body in the plane of the flow as illustrated in FIG. 8B.

Second, the Reynolds number of the gas flow past each bluff body should also be less than the Reynolds number of the gas jet flow exiting the nozzle, as calculated in equation 1 above where $D_j$ is defined as d in FIG. 8A.

Accordingly, combining the first and second features yields the following expression for the bluff body Reynolds number in equation 5:

$$50 \leq Re_{bb-i} \leq Re_j \quad (5)$$

Third, each bluff body should traverse a length, $L_i$, between 0.5 and 1.0 times the characteristic width, W, of the gas flow plane as shown in FIG. 8A, as shown in equation 6:

$$0.5 \leq L_i/W \leq 1.0 \quad (6)$$

Note that in the edge case of $L_i/W=1.0$, the i-th bluff body would completely cross the central conduit and be non-truncated.

Fourth, the streamwise bluff body separation, defined as the axial distance between two neighboring or adjacent bluff bodies divided by the upstream bluff body length scale, $X_i/D_{bb-i}$ (see FIG. 8A for the case of i=2) should be less than or equal to 30 in order to ensure that the region of strong vorticity generated by one bluff body persists long enough to reach the next bluff body. As used herein, the term "adjacent" refers to two bluff bodies that are nearest neighbors in the axial direction.

Fifth, the normalized streamwise separation between the farthest downstream bluff body and the nozzle exit plane, $X_1/D_{bb-1}$ (see FIG. 8A) should be less than or equal to 30.

Figure 9A:
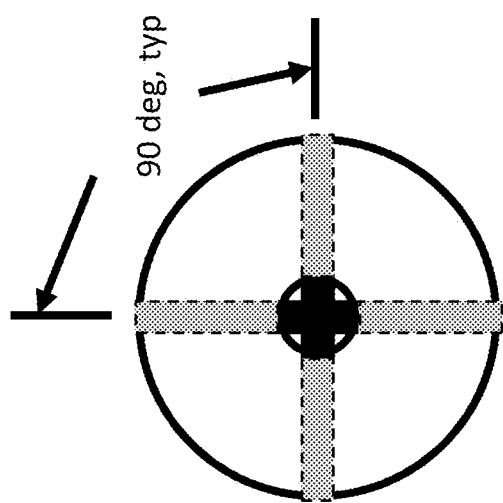

In one embodiment of an oxy-fuel burner for use in forehearth applications, each bluff body is introduced from a different circumferential position around the boundary of the central conduit as illustrated in FIGS. 9A and 9B, and the streamwise or axial bluff body separation is less than or equal to 10. The spacing angle between adjacent bluff bodies in the circumferential direction generates eddy vorticity having a multiplicity of axes which subsequently results in broader distribution of turbulence throughout the flow field, while ensuring low dissipation of the vertical flow structures prior to interaction with the adjacent downstream bluff body.

Preferably, four bluff bodies with circumferential spacing angles between adjacent bluff bodies of about 90 degrees are employed, where about is defined as ±10 degrees (i.e., the spacing between each adjacent pair of bluff bodies can be from 80 degrees to 100 degrees). In addition, more preferably, the streamwise bluff body separation is less than or equal to 5 and the bluff bodies extend across the diameter of the exit nozzle, d, as in FIGS. 8A and 8B. This requires adding a term to equation 6, yielding equation 7:

$$0.5 \times (1+d/W) \leq L_i/W \leq 1.0 \quad (7)$$

Equations 4, 5, 6, and 7 are presented for the case in which each bluff body may have different dimensions and spacing. In the case where it is advantageous for all bluff bodies to have the same dimensions and/or spacing, the terms $D_{bb}$, L, X, and $Re_{bb}$ may replace $D_{bb-i}$, $L_i$, $X_i$, and $Re_{bb,i}$ for simplicity.

The intention is to amplify the interaction between the wake flow fields of adjacent bluff bodies, with the expectation of a resultant increase in turbulence generation.

EXAMPLE

Figure 10A:
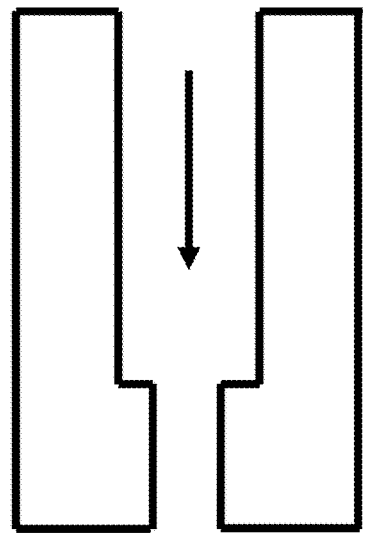
Figure 10B:
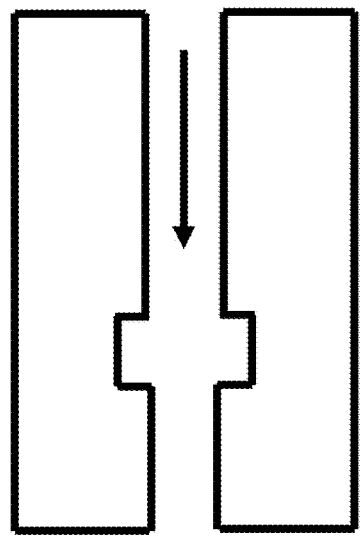
Figure 10C:
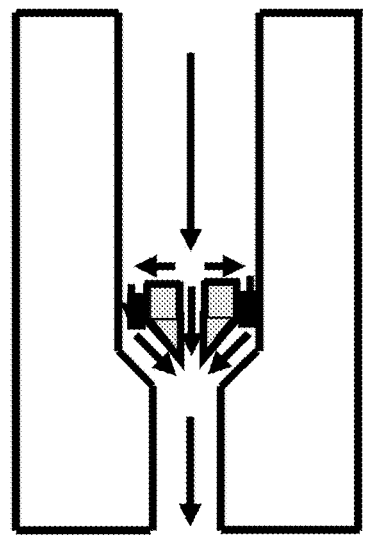
FIG. 10C shows a burner gas supply conduit having a split-flow nozzle.

An experimental comparison was made of several embodiments of the oxy-fuel burner including design principles as set forth herein against four other configurations: a baseline nozzle having no upstream turbulence generating devices (FIG. 10A), nozzles having both one and two bluff bodies of the variety already described and two nozzle designs having upstream turbulence generators that were not of the bluff body variety, a nozzle having a circumferential wall cavity (FIG. 10B as shown in U.S. Pat. No. 10,393,373) and a nozzle in which fuel is internally split into two streams and then vigorously recombined (FIG. 10C). The current tested nozzle designs, as well as the four comparative designs, are summarized in Table 1. Note that in the case of multiple bluff bodies, although the L, $D_{bb}$, and X values are equal for each bluff body or spacing between each bluff body, in alternative embodiments of the present invention each bluff body may take on its own value of L, $D_{bb}$, and X subject to the limitations of equations 5, 6, and 7.

TABLE 1

| Nozzle Designation | Description | L/W | d/W | $X_{2-4}/D_{bb-2-4}$ | $X_1/D_{bb-1}$ |
|---|---|---|---|---|---|
| 0 | Baseline (FIG. 10A) | N/A | 0.6-0.7 | N/A | N/A |
| C | Cavity (FIG. 10B) | N/A | 0.6-0.7 | N/A | N/A |
| S | Split, then Convergent Streams (FIG. 10C) | N/A | 0.6-0.7 | N/A | N/A |
| 1-BB | Single Bluff Body | 0.5-1.0 | 0.6-0.7 | N/A | 7 |
| 2-BB | 2 Bluff Bodies, 180 degrees apart | 0.5 | 0.6-0.7 | 4 | 7-10 |
| 3-BB | Inventive Burner - 3 Bluff Body, 120 degrees apart | 0.5 | 0.6-0.7 | 4 | 7 |
| 4-BB-S | Inventive Burner - 4 Bluff Body, 90 degrees apart | 0.5 | 0.6-0.7 | 4 | 7 |
| 4-BB-L | Inventive Burner - 4 Bluff Body, 90 degrees apart | 0.8 | 0.6-0.7 | 1-4 | 7 |

Figure 11:
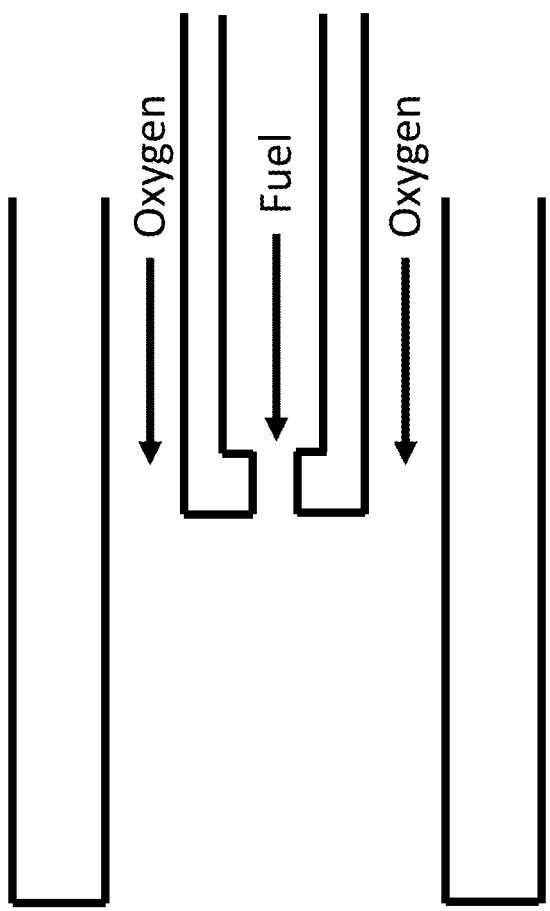
FIG. 11 is a cross-sectional side schematic view showing the position of burner gas supply conduits as in FIGS. 8A through 10C for experimental oxy-fuel combustion tests to measure transitional Reynolds number, pressure drop in the gas supply conduit, and flame length.
Figure 12B:
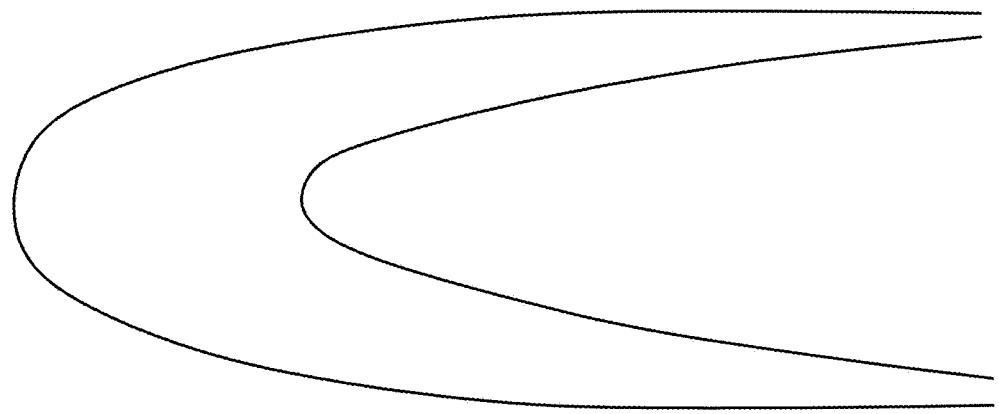
FIGS. 12A and 12B show a schematic comparison of flame fronts in a turbulent flame (FIG. 12A) in which turbulent fluctuations imposed on a laminar flame front result in formation of flamelets, and a laminar flame, which the flame front is generally well defined (FIG. 12B).
Figure 12A:
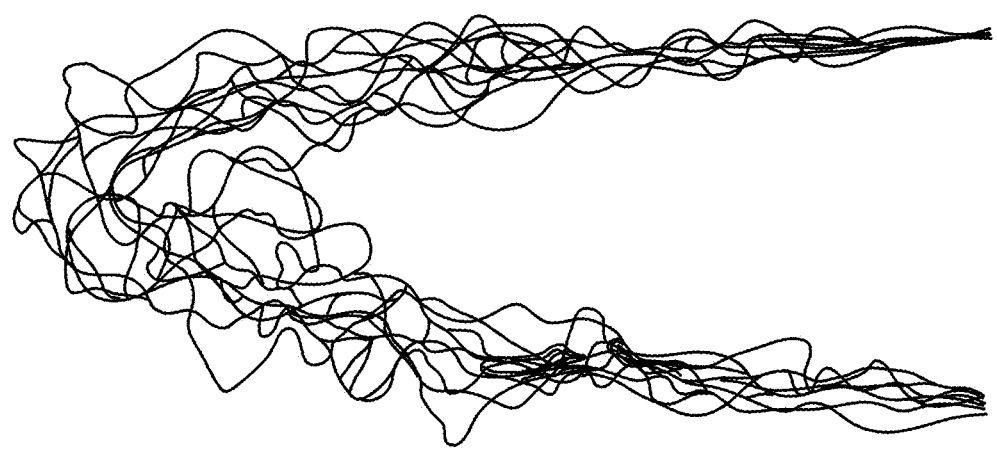

Oxy-fuel combustion tests were conducted wherein fuel was introduced through the central nozzle designs listed in Table 1 inserted within an oxygen plenum as shown in FIG. 11. The oxygen was commercial-grade (greater than 99% pure) while the fuel was pipeline natural gas. The key parameters for relative assessment of the nozzles included:

First, the laminar-to-turbulent "transitional" Reynolds number, $Re_{TR}$, of the central jet. Determination of $Re_{TR}$ was made by the initial appearance of distortion and temporal movement of the flame interface between the fuel and oxygen streams. This type of flame front appearance, sometimes referred to as a turbulent brush or flamelets, are depicted schematically in FIGS. 12A and 12B (see Turns, *An Introduction to Combustion*, 2$^{nd}$ Edition, McGraw-Hill Book Company, New York, 2000).

Second, the total fuel pressure loss normalized by the kinetic energy head loss at the nozzle exit plane; i.e. $\Delta P_{total}/ \frac{1}{2} \rho V_{exit}^2$.

Third, the length of the flame as a function of the central nozzle flow rate. Flame length measurements reported herein were made by image analysis of flame photographs. The basis of the flame length determination was identification of the interface between the largely unreacted orange portion of the central fuel jet produced by soot formation and the adjacent light blue color associated with non-equilibrium, high-temperature emission of $C_2$, the so-called Swan band at the highly reactive portion of the flame tip.

Figure 13:
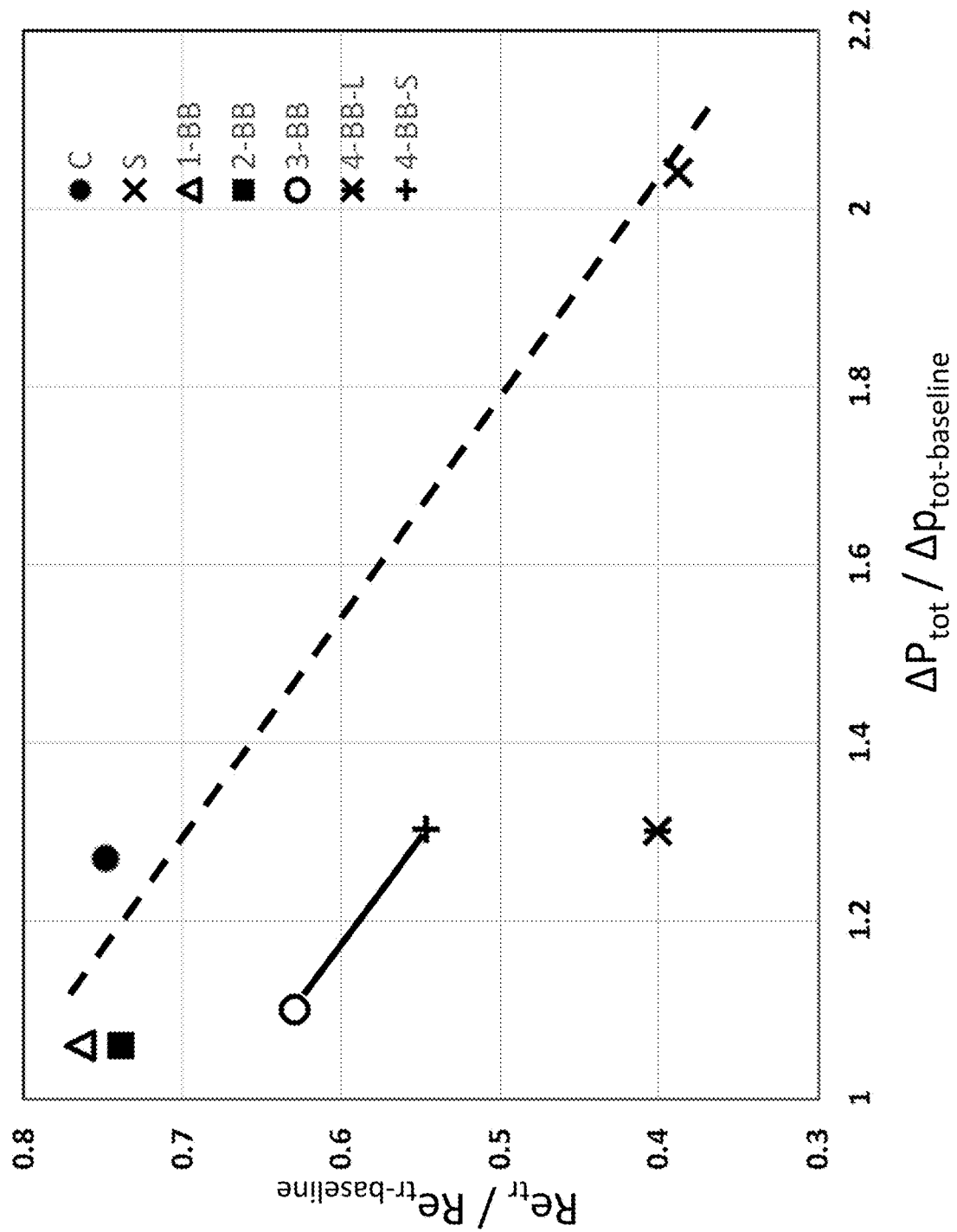
FIG. 13 is a plot of the experimentally measured transitional Reynolds number as a function of the pressure drop in the gas supply conduit.

FIG. 13 compares the average transitional Reynolds number and average total pressure loss for the different nozzle designs, normalized by the respective values associated with the baseline nozzle. Two essentially parallel lines are added to the chart for emphasis. The upper dashed line connects the results from the cavity-actuated turbulence generator (designation C in Table 1), the single and double bluff-body designs and split stream nozzle (designation S in Table 1). The lower solid line is a linear curve fit of the data for the nozzles described herein (3-BB and 4-BB-S). Finally, the data point from the long, 4 bluff body nozzle (4-BB-L) is positioned below the solid line. Comparison of these data and curves strongly suggests that, for a given pressure loss, the burner with the inventive nozzles achieves a greater reduction in the transitional Reynolds number than the other nozzles tested.

It was expected that the 2-BB nozzle would have had a greater reduction in transitional Reynolds number, more similar to 3-BB than 1-BB. The inventors speculate, without being bound by theory, that the 3-BB and 4-BB configurations may be more effective because the turbulent effects are amplified to a greater extent when the spacing angle between adjacent bluff bodies are about 120 degrees (i.e., from 110 degrees to 130 degrees) in the 3-BB case or about 90 degrees (i.e., from 80 degrees to 100 degrees) in the 4-BB case. In the 2-BB configuration one or more of the vortices generated by the upstream bluff body may have been better aligned with the downstream bluff body due to the 180 degree spacing angle, leading to less amplification. For this reason a 2-BB nozzle may be more effective at reducing the transitional Reynolds number if the circumferential spacing angle between the two adjacent bluff bodies is more than about 0 degrees and less than about 180 degrees, or more than about 60 degrees and less than about 180 degrees.

Figure 1:
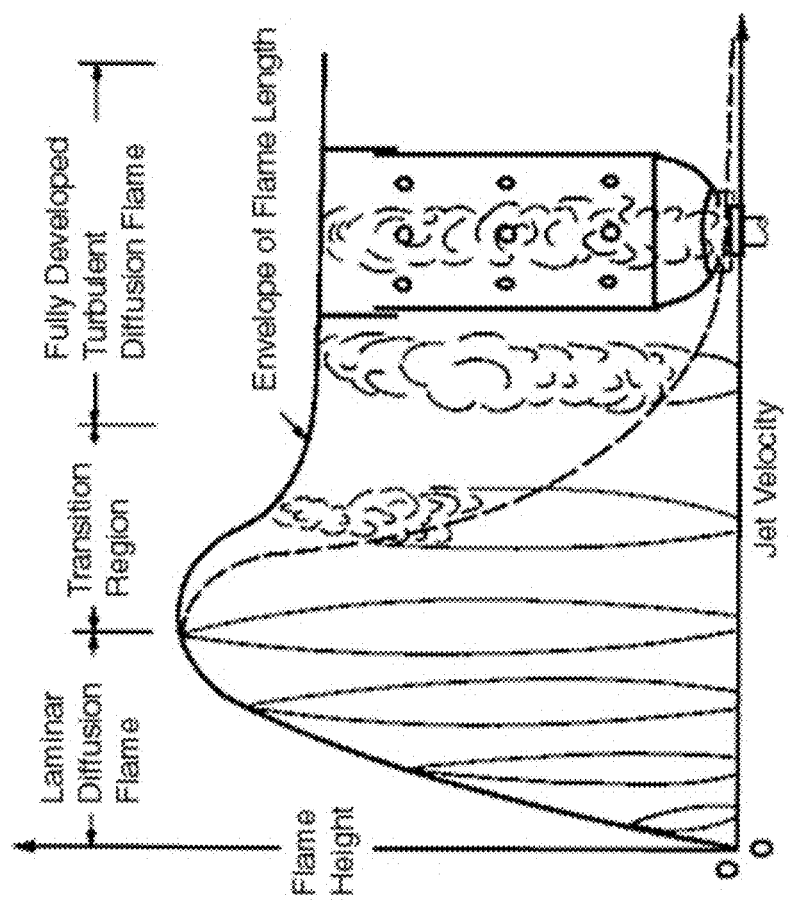
FIG. 1 is a plot of flame height as a function of jet velocity, reproduced from Hottel and Hawthorne ("Diffusion in Laminar Jet Flames", *Third Symposium on Combustion, Flame and Explosion Phenomena*, pp. 254-266, 1949).
Figure 14:
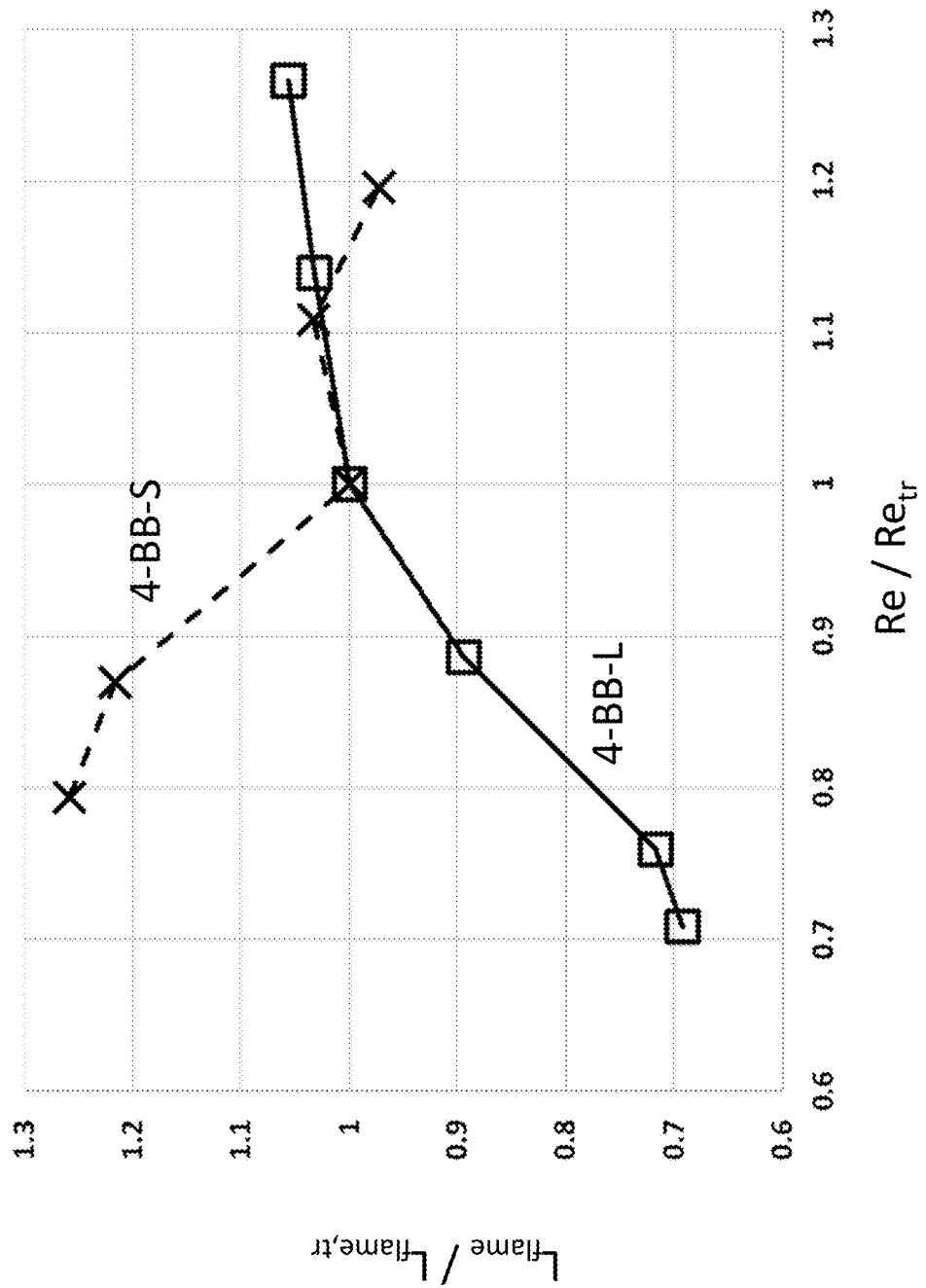
FIG. 14 is a plot of the experimentally measured flame length as a function of transitional Reynolds number for two embodiments of the present invention.

Moreover, of the inventive nozzles tested, the one employing the longer bluff bodies, 4-BB-L, demonstrated the greatest reduction in transitional Reynolds number for a given pressure loss. Further to this point, FIG. 14 shows a plot of flame length as a function of Reynolds number, both normalized to the baseline nozzle 0, for the embodiments 4-BB-S and 4-BB-L. We note that the 4-BB-L data reflects a monotonically increasing flame length with Reynolds number, unlike the 4-BB-S data which shows a longer flame just below the transition to turbulent flow. The behavior of 4-BB-S is indicative of the transition from molecular to eddy diffusivity previously explained and illustrated in FIG. 1. The absence of the spike in flame length for 4-BB-L confirms the significant and unexpected enhancement in turbulence production associated with the longer bluff-bodies. This conclusion thus provides further evidence fore the enhanced performance of the longer bluff bodies inferred from data in FIG. 13 which shows that 4-BB-L has a lower transitional Reynolds number compared to the trendline that would result from 3-BB, and 4-BB-S.

Although all experiments took place with fuel in the nozzle and oxygen through the annulus, it is evident that similar beneficial results could have been achieved by flowing oxygen through the nozzle and fuel through the annulus. Ensuring that the gas flowing through the nozzle exit plane is turbulent is sufficient to promote mixing and achieve a turbulent flame.

While the principles of the invention have been described above in connection with preferred embodiments, it is to be clearly understood that this description is made only by way of example and not as a limitation of the scope of the invention.

The invention claimed is:

1. A burner gas supply apparatus for increasing flame turbulence, the apparatus comprising:

a conduit having a characteristic width, W, defined by an inner surface having a circumferential direction and an axial direction, the axial direction terminating in a nozzle defining a nozzle exit plane and having a characteristic dimension, d, where $d<=W$; and a first bluff body having characteristic dimension, $D_{bb-1}$, projecting a length, $L_1$, into the conduit from the inner surface, wherein $0.5<=L_1/W<=1$, the first bluff body being spaced apart from the nozzle exit plane by an axial distance of $X_1$, wherein $X_1/D_{bb-1}<=30$; and a second bluff body having a characteristic dimension, $D_{bb-2}$, projecting a length, $L_2$, into the conduit from the inner surface, wherein $0.5<=L_2/W<=1$, the second bluff body being further in the axial direction from the nozzle exit plane than the first bluff body and spaced apart from the first bluff body by an axial distance of $X_2$, wherein $X_2/D_{bb-2}<=30$;

a third bluff body having a characteristic dimension, $D_{bb-3}$, projecting a length, $L_3$, into the conduit from the inner surface, wherein $0.5<=L_3/W<=1$, the third bluff body being further in the axial direction from the nozzle exit plane than the second bluff body and spaced apart from the second bluff body by an axial distance of $X_3$, wherein $X_3/D_{bb-3}<=30$;

wherein the first bluff body and the second bluff body are separated in the circumferential direction by a first spacing angle;

wherein the second bluff body and the third bluff are separated in the circumferential direction by a second spacing angle; and wherein the first bluff body and the conduit are sized so that a first bluff body Reynolds number, $Re_{bb-1}=\rho V_{inlet} D_{bb-1}/\mu$, is equal to or greater than 50; and wherein the nozzle characteristic dimension, d, is sized so that a jet Reynolds number, $Re_j=\rho V_j d/\mu$, is equal to or greater than the first bluff body Reynolds number, $Re_{bb-1}$.

2. The burner gas supply apparatus of claim 1,
wherein $0.5*(1+d/W)<=L_1/W<=1$;
wherein $0.5*(1+d/W)<=L_2/W<=1$; and
wherein $0.5*(1+d/W)<=L_3/W<=1$.

3. The burner gas supply apparatus of claim 1,
wherein $0.8<=L_1/W<=1$;
wherein $0.8<=L_2/W<=1$; and
wherein $0.8<=L_3/W<=1$.

4. The burner gas supply apparatus of claim 1, wherein $0.6<=d/W<=0.7$.

5. The burner gas supply apparatus of claim 1,
wherein $X_1/D_{bb-1}<=5$;
wherein $X_2/D_{bb-2}<=5$; and
wherein $X_3/D_{bb-3}<=5$.

6. The burner gas supply apparatus of claim 1, wherein the first bluff body has a circular cross-section.

7. The burner gas supply apparatus of claim 1, wherein the first spacing angle and the second spacing angle are each greater than 60 degrees and less than 180 degrees.

8. The burner gas supply apparatus of claim 1, wherein the first spacing angle and the second spacing angle are each from 110 degrees to 130 degrees.

9. The burner gas supply apparatus of claim 1, wherein the first spacing angle and the second spacing angle are each from 80 degrees to 100 degrees.

10. The burner gas supply apparatus of claim 1, further comprising:

a fourth bluff body having a characteristic dimension, $D_{bb-4}$, projecting a length, $L_4$, into the conduit from the inner surface, wherein $0.5<=L_4/W<=1$, the fourth bluff body being further in the axial direction from the nozzle exit plane than the third bluff body and spaced apart from the third bluff body by an axial distance of $X_4$, wherein $X_4/D_{bb-4} \leq 30$;

wherein the third bluff body and the fourth bluff body are separated in the circumferential direction by a third spacing angle.

11. The burner gas supply apparatus of claim 10, wherein the first spacing angle, the second spacing angle, and the third spacing angle are each from 80 degrees to 100 degrees.

12. A burner comprising:
a burner gas supply apparatus as in claim 1; and
a reactant conduit surrounding the burner gas supply apparatus;
wherein the burner gas supply apparatus is configured and arranged to supply one of a fuel and an oxidant; and
wherein the reactant conduit is configured and arranged to supply the other of a fuel and an oxidant.

* * * * *